United States Patent [19]

Brambilla

[11] Patent Number: 5,468,442
[45] Date of Patent: Nov. 21, 1995

[54] APPARATUS AND PROCESS FOR GAUGING AND CONTROLLING EXTRUDED PROFILED ELEMENTS

[75] Inventor: Romano Brambilla, Modena, Italy

[73] Assignee: Brabor S.r.l., Ubersetto di Fiorano, Italy

[21] Appl. No.: 249,010

[22] Filed: May 25, 1994

[51] Int. Cl.⁶ .................................................. B29C 47/90
[52] U.S. Cl. .................. 264/519; 264/557; 264/568; 264/571; 264/177.19; 264/209.4; 264/235; 264/321; 264/327; 425/71; 425/326.1; 425/379.1; 425/388
[58] Field of Search ............. 264/519, 565–568, 264/177.1, 177.17–177.19, 209.3–209.8, 327, 321, 235, 346, 557, 571; 425/379.1, 326.1, 388, 325, 71

[56] References Cited

U.S. PATENT DOCUMENTS

| | | |
|---|---|---|
| 3,804,574 | 4/1974 | Gatto ........................ 425/325 |
| 4,100,243 | 7/1978 | Wissinger et al. ............. 264/177.19 |
| 4,110,062 | 8/1978 | Summers ........................ 425/71 |
| 4,113,411 | 9/1978 | Terragni ....................... 425/325 |
| 4,115,495 | 9/1978 | Hartitz ........................ 264/567 |
| 4,181,487 | 1/1980 | Kessler ........................ 264/566 |
| 4,399,086 | 8/1983 | Walter ......................... 425/325 |
| 4,530,650 | 7/1985 | Milani ......................... 425/325 |
| 4,913,863 | 4/1990 | Burrafato et al. .............. 425/379.1 |
| 5,132,062 | 7/1992 | Brambilla ...................... 425/379.1 |
| 5,342,187 | 8/1994 | Ohanesian ...................... 425/326.1 |

*Primary Examiner*—Jeffery R. Thurlow
*Attorney, Agent, or Firm*—Guido Modiano; Albert Josif

[57] ABSTRACT

Apparatus and process for gauging and controlling extruded profiled elements, particularly extruded profiled elements made of synthetic material. The apparatus includes at least one control and correction gauge arrangeable downstream of an extrusion die along the extrusion direction and in which there is a passage shaped so as to match the profile of the extruded profiled element. The passage can be crossed by the extruded profiled element, and there are holes and/or channels for heating and cooling preset regions of the profiled element to correct the profile and/or the internal tensions of the profiled element.

13 Claims, 2 Drawing Sheets

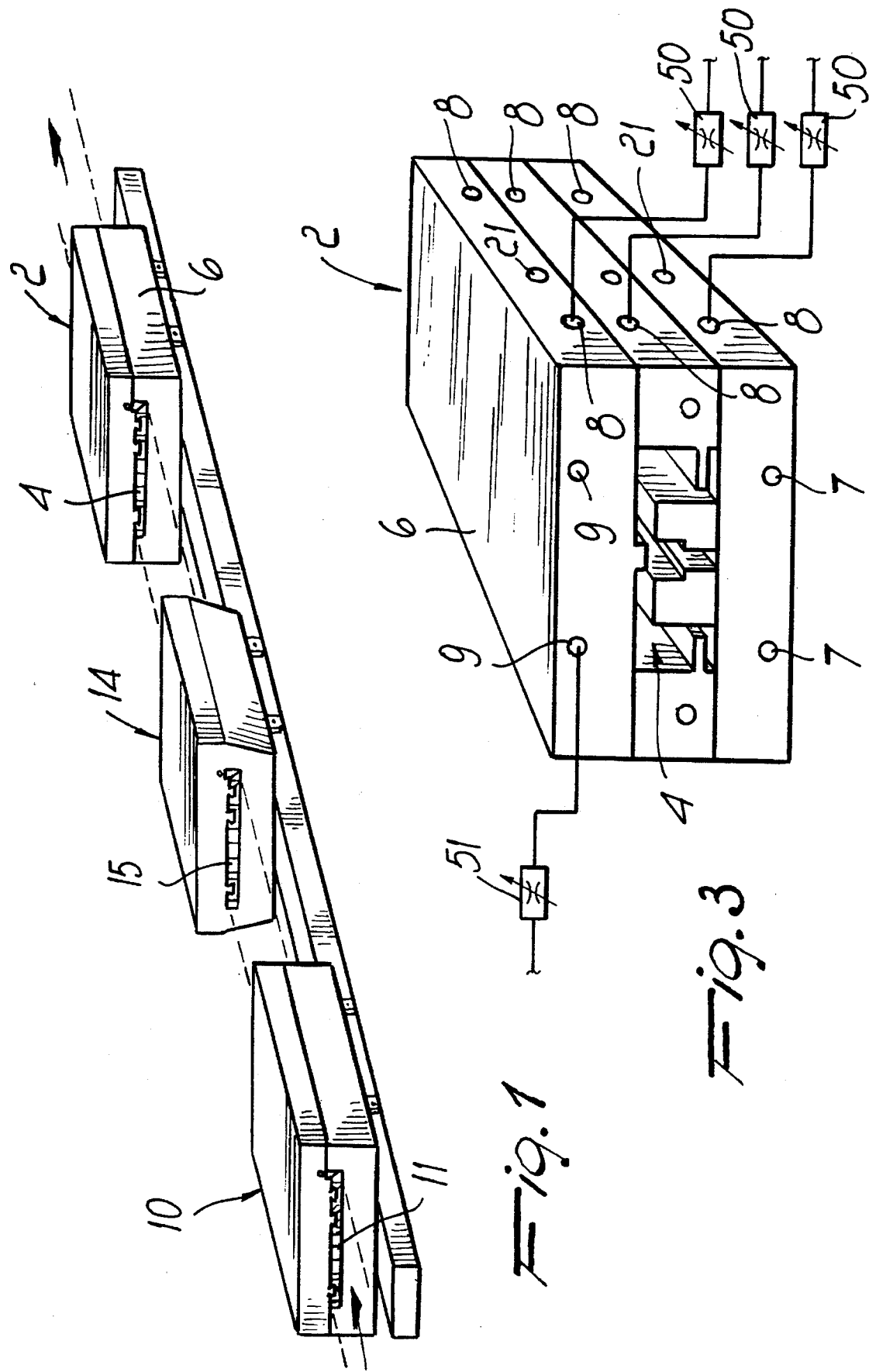

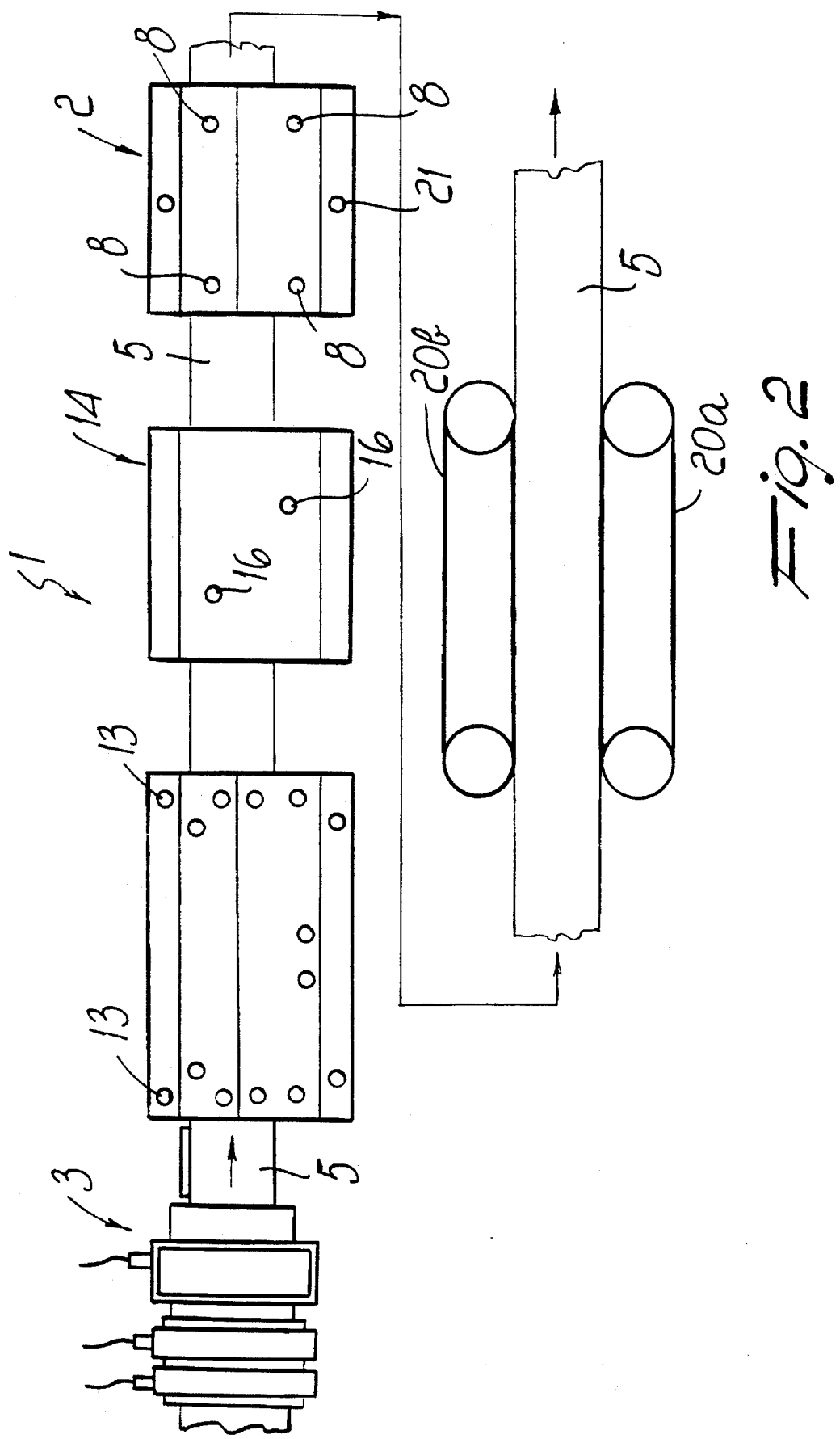

APPARATUS AND PROCESS FOR GAUGING AND CONTROLLING EXTRUDED PROFILED ELEMENTS

BACKGROUND OF THE INVENTION

The present invention relates to an apparatus and to a process for gauging and controlling extruded profiled elements, particularly for extruded profiled elements made of synthetic material, such as for example extruded profiled elements based on polyvinyl chloride, both of the "rigid" and "foamed" type.

In conventional production lines for extruded profiled elements, particularly in the case of extruded items made of synthetic material, the profiled element that leaves the extrusion die is cooled so as to stabilize its shape and allow its support and movement. The profiled element is generally cooled inside appropriate structures, termed "gauges", which have a through passage shaped like the profile of the profiled element which is conveyed along said passage so as to avoid as much as possible deformations of the profile during this cooling step. Cooling is performed by circulating coolant inside channels that run in the gauges proximate to the passage along which the profiled element advances.

In order to avoid variations in the profile of the profiled element with respect to the profile defined during design, the cooling action is sometimes combined with suction at preset regions of the profile.

However, in the execution of particularly complicated profiles these solutions do not meet the most demanding application requirements of the extruded item, particularly as regards precision at sharp corners, ridges and angles of more or less than 90°, and surface flatness. At these regions, the techniques currently in use are not always able to compensate for the internal tensions of the profile which are the main cause of permanent deformations.

Due to this reason, the finished product may have anomalies that are no longer recoverable.

In view of this fact, in order to achieve acceptable results, setup operations, corrections, and adjustments are performed during the production of profiled elements or during forced interruptions, with a considerable waste of time and material that significantly affects overall production costs.

SUMMARY OF THE INVENTION

A principal aim of the present invention is to solve the above described problems by providing an apparatus and a process to produce highly precise profiled elements that faithfully reflect the design data even in the presence of regions that are difficult to form, such as for example sharp corners, flat surfaces, or in terms of the linearity of the profiled element as a whole.

A particular object of the invention is to provide an apparatus for correcting deformations of the profiled element caused by internal tensions during the cooling step.

Another object of the invention is to provide an apparatus that considerably simplifies the setup operations of the extrusion machine, limiting the waste of time and material and thus reducing overall production costs.

With this aim and objects in view, there is provided, according to the present invention, an apparatus for gauging and controlling extruded profiled elements, particularly for extruded profiled elements made of synthetic material, comprising at least one control and correction gauge arrangeable downstream of an extrusion die, along the extrusion direction, and in which there is a passage that is shaped so as to match the profile of the extruded profiled element and can be crossed by said extruded profiled element, said at least one control and correction gauge having means for heating said profiled element and means for cooling preset regions of said profiled element to correct the profile and/or the internal tensions of said profiled element.

BRIEF DESCRIPTION OF THE DRAWINGS

Further characteristics and advantages of the present invention will become apparent from the following description of a preferred but not exclusive embodiment thereof, illustrated only by way of non-limitative example in the accompanying drawings, wherein:

FIG. 1 is a schematic perspective view of the apparatus according to the invention;

FIG. 2 is a schematic lateral elevation view of the apparatus according to the invention, arranged downstream of an extrusion die; and FIG. 3 is a schematic perspective view of a control and correction gauge according to the invention.

DESCRIPTION OF THE PREFERRED EMBODIMENTS

With reference to the above figures, the gauging and control apparatus according to the invention, generally designated by the reference numeral 1, comprises at least one control and correction gauge 2, adapted to be arranged downstream of an extrusion die 3 along the extrusion direction and through which there is a passage 4, which is shaped so as to match the profile of the extruded profiled element 5 and through which said extruded profiled element 5 can pass. The control and correction gauge 2 has means for heating preset regions of the profiled element 5 and means for cooling preset regions of said profiled element 5 so as to correct the profile and/or the internal tensions of the profiled element 5 (which are caused by the heat remaining trapped inside, since cooling occurs on the outer surfaces).

More particularly, the gauge 2 is substantially constituted by a parallelepipedal body 6 crossed by the passage 4 at a central region. The heating means are preferably constituted by glow plugs or electric resistors of a known type, not illustrated for the sake of simplicity, which are inserted into appropriate holes 7 formed in the body 6 of the gauge 2 proximate to the regions of the passage 4 through which the regions to be heated of the profiled element 5 pass.

The means for cooling the control and correction gauge 2 comprise multiple channels 8 formed inside the body 6 of the gauge 2 and lying adjacent to the regions of the passage 4 whereat the regions of the profiled element 5 to be cooled pass.

Conveniently, ducts 9 are also formed in the body 6 of the gauge 2, are directly connected to the passage 4 in preset regions, and are connectable in any known manner, such as valves or the like to suction means of a known type, such as for example a vacuum pump, in order to produce suction at preset regions of the profiled element as it passes through the passage 4.

In practice, the control and correction gauge 2 is formed according to the heating, cooling or suction actions to be applied to preset regions of the profiled element 5 according to its shape. The arrangement of the heating regions, of the cooling regions and of the suction regions is preset during design as a function of the shape of the profiled element 5 so as to fully eliminate the internal tensions of the profiled element caused by the heat trapped inside said profiled element due to its external cooling.

The apparatus according to the invention also comprises a first cooling gauge 10 arranged upstream of the control and correction gauge 2, i.e. directly downstream of the extrusion die 3.

The first cooling gauge 10 is also constituted by a substantially parallelepipedal body crossed, at a central region, by a passage 11 that is shaped like the profiled element 5, so that the profiled element 5 can be moved through said passage. The first cooling gauge 10 has means for cooling the profiled element 5 and means for generating suction in preset regions of the passage 11 that correspond to preset regions of the profiled element 5.

More particularly, the cooling means of the first cooling gauge 10 comprise, as already described with reference to the control and correction gauge 2, multiple channels running inside the body of the gauge 10 adjacent to the regions of the passage 11 to be cooled; said channels can be connected in any known manner, such as valves or the like to coolant supplying means such as for example a pump of a known type which is not illustrated for the sake of simplicity.

The means for generating suction at preset regions of the passage 11 include ducts 13 running inside the body of the gauge 10 and directly connected to preset regions of the passage 11. Said ducts 13 can be connected in any known manner, such as valves or the like to known suction means, such as for example a vacuum pump.

Advantageously, a second cooling gauge, generally designated by the reference numeral 14, is interposed between the first cooling gauge 10 and the control and correction gauge 2; said second cooling gauge is also crossed, at one of its central regions, by a passage 15 which is shaped so as to match the shape of the profiled element 5 so that it can be crossed by said profiled element 5.

Said second cooling gauge 14 has cooling means constituted by channels 16 running inside the body of the second cooling gauge 14 and connectable in any known manner, such as valves or the like to means, constituted for example by a pump of a known type which is not illustrated for the sake of simplicity, for circulating coolant inside said channels 16.

Water can be used as coolant, in a per se known manner, for the various gauges 2, 10 and 14.

Downstream of the apparatus according to the invention there are, in a per se known manner, means for the advancement of the extruded profiled element 5; said means can be constituted for example by a pair of traction belts, respectively 20a and 20b.

Temperature sensing means are conveniently provided inside the control and correction gauge 2; said means are constituted for example by heat probes inserted in appropriate holes 21 to monitor the temperature of the gauge in the various regions affected by heating and/or cooling.

In practice, the extruded profiled element 5 leaving the extrusion die passes through the first cooling gauge 10, where it undergoes combined intense cooling and suction in preset regions, i.e. in the regions where it is most difficult to obtain a perfect reproduction of the design profile, so that the profile of the profiled element 5 stabilizes. Then the profiled element 5 passes through the second cooling gauge 14, where the effect of reducing the drawing of the extruded element, produced by the traction applied by the means 20a and 20b, is maintained.

The profiled element 5 then reaches the control and correction gauge 2, by means of which it is possible, by heating and cooling and applying suction in preset regions of the profiled element, not only to draw out the heat that has remained trapped inside, so as to remove all tensions that can be caused by said reaction, but also to modify the shape of the profiled element in those regions where said shape differs from the design shape. It should be noted that the heating temperature, the extent of the cooling action, as well as the degree of the suction can be altered adequately according to the requirements for example by controlling the temperature of the heating resistors with known heat regulators and by controlling the inflow of coolant and the flow of air aspirated inside the various gauges by means of controllable electric valves 50 and 51 located on the channels 8 and 16 and on the ducts 9 and 13.

In practice it has been observed that the apparatus and the process according to the invention fully achieve the intended aim since they produce highly precise profiled elements even in the case of particularly complicated profiles.

The apparatus and the process thus conceived are susceptible to numerous modifications and variations (such as for example variations in the position/succession of the gauges), all of which are within the scope of the inventive concept; all the details may furthermore be replaced with other technically equivalent elements.

In practice, the materials employed, as well as the dimensions, may be any according to the requirements and the state of the art.

What is claimed is:

1. Apparatus for gauging and controlling extruded profiled elements, particularly for extruded profiled elements made of synthetic material, comprising at least one cooling gauge arranged downstream of an extrusion die and at least one control and correction gauge arrangeable downstream of said at least one cooling means, along the extrusion direction, said control and correction gauge being provided with a passage that is shaped so as to match the profile of the extruded profiled element and as to allow said extruded profiled element to cross said at least one control and correction gauge, said at least one control and correction gauge having means for heating preset regions of said profiled element and means for cooling preset regions of said profiled element to correct and/or stabilize the profile of said profiled element.

2. Apparatus according to claim 1, wherein inside said control and correction gauge there are ducts connected to preset regions of said passage and connectable to suction means to generate suction in preset regions of the profile of said profiled element as it passes through said passage.

3. Apparatus according to claim 1, wherein a passage is formed through said first cooling gauge, is shaped so as to match the profile of the extruded profiled element, and is suitable to be crossed by said extruded profiled element, ducts being formed inside said first cooling gauge, said ducts being connected to preset regions of said passage and being connectable to suction means to produce suction at preset regions of the profile of said profiled element as it passes through said passage.

4. Apparatus according to claim 1, wherein a second cooling gauge is interposed between said first cooling gauge and said control and correction gauge, a passage being formed in said cooling gauge, said passage being shaped so as to match the profile of the extruded profiled element and as to allow said extruded profiled element to cross said passage, said second cooling gauge having means for cooling said profiled element when it passes through said second gauge.

5. Apparatus according to claim 1, wherein said cooling means comprise multiple channels running inside said gauge proximate to said passage and connectable to means for supplying a coolant.

6. Apparatus according to claim 4, wherein at least in said control and correction gauge there are means for detecting the temperature in preset regions of said control and correction gauge.

7. Apparatus according to claim 3, comprising means for adjusting the extent of the suction applied by said suction means along said ducts.

8. Apparatus according to claim 5, comprising means for adjusting the flow-rate of said coolant along said channels.

9. Control and gauging process for extruded profiled elements, particularly for extruded profiled elements made of synthetic material, consisting in passing said profiled elements, after extrusion, through at least one cooling gauge so as to cool said profiled elements;

passing said profiled element through at least one gauge and correction means;

heating and cooling, within said at least one gauge and correction means, preset regions of the profiled element in order to correct any anomalies in the profile of said extruded element and to stabilize said profile.

10. Process according to claim 9, wherein said heating is performed simultaneously with the cooling of other preset regions of said extruded profiled element.

11. Process according to claim 10, wherein said heating and/or cooling of the profiled element is combined with suction at preset regions of said profiled element.

12. Process according to claim 10, wherein said heating and/or cooling is performed inside said at least one cooling means and said at least one gauge and correction means arranged along a line for the advancement of the extruded profiled element and in which a passage is formed which has a shape that matches the shape of the extruded profiled element and can be crossed by said extruded profiled element.

13. Process according to claim 10, wherein said cooling is performed by circulating coolant inside said at least one cooling gauge and said at least one gauge and correction means proximate to said passage.

* * * * *